US012692353B2

(12) United States Patent
Okamoto et al.

(10) Patent No.: US 12,692,353 B2
(45) Date of Patent: Jul. 28, 2026

(54) WATER-SOLUBLE FILM AND PACKAGE

(71) Applicant: KURARAY CO., LTD., Okayama (JP)

(72) Inventors: Minoru Okamoto, Okayama (JP);
Sayaka Shimizu, Okayama (JP);
Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 544 days.

(21) Appl. No.: 18/003,791

(22) PCT Filed: Jun. 14, 2021

(86) PCT No.: PCT/JP2021/022538
§ 371 (c)(1),
(2) Date: Dec. 29, 2022

(87) PCT Pub. No.: WO2022/004344
PCT Pub. Date: Jan. 6, 2022

(65) Prior Publication Data
US 2023/0257536 A1 Aug. 17, 2023

(30) Foreign Application Priority Data
Jun. 29, 2020 (JP) ................................. 2020-111939

(51) Int. Cl.
| | |
|---|---|
| *C08J 5/18* | (2006.01) |
| *C08K 3/34* | (2006.01) |
| *C08K 5/17* | (2006.01) |
| *C11D 3/395* | (2006.01) |
| *C11D 17/04* | (2006.01) |

(52) U.S. Cl.
CPC ................... *C08J 5/18* (2013.01); *C08K 3/34* (2013.01); *C08K 5/17* (2013.01); *C11D 3/3956* (2013.01); *C11D 17/043* (2013.01); *C08J 2329/04* (2013.01); *C08K 2003/343* (2013.01)

(58) Field of Classification Search
CPC ........... C08J 5/18; C08J 2329/04; C08K 5/17
See application file for complete search history.

(56) References Cited

U.S. PATENT DOCUMENTS

| | | | |
|---|---|---|---|
| 5,484,881 A | 1/1996 | Gruber et al. | |
| 9,908,957 B2 | 3/2018 | Mori et al. | |
| 2004/0092635 A1 | 5/2004 | Kitamura et al. | |
| 2016/0194465 A1* | 7/2016 | Takafuji | C08F 216/06 424/405 |
| 2016/0326285 A1 | 11/2016 | Mori et al. | |
| 2018/0105338 A1 | 4/2018 | Ieda et al. | |
| 2019/0002683 A1 | 1/2019 | Michitaka et al. | |
| 2019/0211289 A1 | 7/2019 | Friedrich et al. | |
| 2019/0300693 A1 | 10/2019 | Nii et al. | |
| 2019/0359795 A1 | 11/2019 | Sakai et al. | |
| 2021/0009774 A1 | 1/2021 | Ichiki | |
| 2021/0130576 A1 | 5/2021 | Kani | |
| 2021/0324156 A1 | 10/2021 | Okamoto et al. | |

| | | | |
|---|---|---|---|
| 2021/0324161 A1 | 10/2021 | Okamoto et al. | |
| 2021/0324162 A1 | 10/2021 | Okamoto et al. | |
| 2021/0324164 A1 | 10/2021 | Okamoto et al. | |
| 2022/0041824 A1 | 2/2022 | Okamoto et al. | |
| 2022/0204711 A1 | 6/2022 | Menozzi et al. | |

FOREIGN PATENT DOCUMENTS

| | | |
|---|---|---|
| CN | 104662071 A | 5/2015 |
| EP | 3348608 A1 | 7/2018 |
| EP | 3677405 A1 | 7/2020 |
| EP | 3904231 A1 | 11/2021 |
| EP | 3904435 A1 | 11/2021 |
| EP | 3904437 A1 | 11/2021 |
| JP | 2001-329130 A | 11/2001 |
| JP | 2003-206380 A | 7/2003 |
| JP | 2004-161823 A | 6/2004 |
| JP | 2005-179390 A | 7/2005 |
| JP | 2006-188655 A | 7/2006 |
| JP | 2006-188661 A | 7/2006 |
| JP | 2006-307059 A | 11/2006 |
| JP | WO2008/142835 A1 | 11/2008 |
| JP | 2008290406 A | 12/2008 |

(Continued)

OTHER PUBLICATIONS

Extended European Search Report issued in the corresponding Application No. 21831690.0, mailed Jun. 26, 2024.
Extended European Search Report issued in the related Application No. 21831989.5, mailed Jun. 26, 2024.
Extended European Search Report issued in the corresponding Application No. 21834693.0, mailed Jun. 19, 2024.
Extended European Search Report issued in the related Application No. 21831991.1, mailed Jun. 19, 2024.
Extended European Search Report issued in the related Application No. 21833496.9, mailed Jun. 26, 2024.
"Basic Physical Properties of PVOH Resin: 1. Basic Physical Properties of POVH", kuraray.
Paneru et al., "Surface modification of PVA thin film by nonthermal atmospheric pressure plasma for antifoggin, AIP property", Jul. 10, 2019, AIP Advances 9, 075008.

(Continued)

*Primary Examiner* — Andrew S Rosenthal
(74) *Attorney, Agent, or Firm* — Morgan, Lewis & Bockius LLP

(57) ABSTRACT

[Problem to be solved] To provide a water-soluble film having good transparency and good releasability from a support with less surfactant content.
[Solution] A water-soluble film containing a polyvinyl alcohol resin and surfactant, wherein a content of the surfactant is 0.005 to 1 parts by mass with respect to 100 parts by mass of the polyvinyl alcohol resin, and a ratio S(0)/S(32) of an abundance amount S(0) of the surfactant on at least one surface of the water-soluble film to an abundance amount S(32) of the surfactant on a cross-section surface at a depth of 32 nm from the at least one surface of the water-soluble film, measured by a count number of fragment ions derived from the surfactant detected by time-of-flight secondary ion mass spectrometry on the at least one surface of the water-soluble film, is in the range of 100 to 500.

15 Claims, No Drawings

(56) References Cited

FOREIGN PATENT DOCUMENTS

| | | | |
|---|---|---|---|
| JP | 2009-051947 | A | 3/2009 |
| JP | WO2009/028141 | A1 | 3/2009 |
| JP | 2009154449 | A | 7/2009 |
| JP | 2009-535484 | A | 10/2009 |
| JP | WO2011/132592 | A1 | 10/2011 |
| JP | 2012-082313 | A | 4/2012 |
| JP | WO2013/146147 | A1 | 10/2013 |
| JP | WO2015/020045 | A1 | 2/2015 |
| JP | WO2015/118978 | A1 | 8/2015 |
| JP | WO2016/190235 | A1 | 12/2016 |
| JP | 2017-052841 | A | 3/2017 |
| JP | 2017-078166 | A | 4/2017 |
| JP | 2017-100806 | A | 6/2017 |
| JP | 2017-533304 | A | 11/2017 |
| JP | WO2018/008736 | A1 | 1/2018 |
| JP | 2018-031015 | A | 3/2018 |
| JP | WO2018/061272 | A1 | 4/2018 |
| JP | 2018-154714 | A | 10/2018 |
| JP | 2019-006423 | A | 1/2019 |
| JP | 2019-014109 | A | 1/2019 |
| JP | WO2019/124310 | A1 | 6/2019 |
| JP | 2019177585 | A | 10/2019 |
| JP | WO2019/189684 | A1 | 10/2019 |
| JP | WO2020/004608 | A1 | 1/2020 |
| JP | WO2020/027021 | A1 | 2/2020 |
| JP | WO2020/138437 | A1 | 7/2020 |
| JP | WO2020/138438 | A1 | 7/2020 |
| JP | WO2020/138442 | A | 7/2020 |
| JP | WO2020/138443 | A1 | 7/2020 |
| KR | 10-0590311 | B1 | 6/2006 |
| WO | 2007/133415 | A1 | 11/2007 |
| WO | 2016/061054 | A1 | 4/2016 |
| WO | 2016061026 | A1 | 4/2016 |
| WO | 2017/110749 | A1 | 6/2017 |
| WO | 2019/044751 | A1 | 3/2019 |
| WO | 2020/027020 | A1 | 2/2020 |
| WO | 2020138441 | A1 | 7/2020 |
| WO | 2020138443 | A1 | 7/2020 |
| WO | 2020138444 | A1 | 7/2020 |
| WO | 2020/218321 | A1 | 10/2020 |

OTHER PUBLICATIONS

Peng et al. "Influence of absorbed moisture on solubility of poly-(vinyl alcohol) film during atmospheric pressure plasma jet treatment", Surface & Coatings Technology, 204 (2010) 1222-1228.

Akhter et al., "XPS and IR Study of X-Ray Induced Degradation of PVA Polymer Film", Applied Surface Science, 1998-89, 241-258.

Office Action issued in Japanese Patent Application No. 2022-533806, dated Apr. 22, 2025.

Office Action issued in Japanese Patent Application No. 2022-533809, dated Apr. 22, 2025.

Office Action issued in related U.S. Appl. No. 18/003,782, dated Apr. 17, 2025.

Sakurai, et al.,"Small-Angle X-ray Scattering Study of Lamellar Microdomains in a Block Copolymer," J Appl Cryst, 24: 679-684 (1991).

International Search Report issued in related International Patent Application No. PCT/JP2021/022536 dated Aug. 31, 2021.

International Search Report issued in related International Patent Application No. PCT/JP2021/022537 dated Aug. 17, 2021.

International Search Report issued in related International Patent Application No. PCT/JP2021/022538 dated Aug. 31, 2021.

International Search Report issued in related International Patent Application No. PCT/JP2021/022540 dated Jul. 13, 2021.

International Search Report issued in related International Patent Application No. PCT/JP2021/022535 dated Aug. 24, 2021.

International Search Report issued in related International Patent Application No. PCT/JP2021/022539 dated Aug. 31, 2021.

Office Action issued in Chinese Patent Application No. 202180046095.9, dated Jan. 4, 2025.

Office Action issued in related U.S. Appl. No. 18/003,771, dated Aug. 6, 2025.

Office Action issued in Chinese Patent Application No. 202180046089.3, dated May 14, 2025.

Office Action issued in corresponding Chinese Patent Application No. 202180046093.X, dated Jun. 5, 2025.

Office Action issued in Chinese Patent Application No. 202180046098.2, dated May 21, 2025.

Office Action issued in Chinese Patent Application No. 202180046124.1, dated May 16, 2025.

Office Action issued in corresponding Chinese Patent Application No. 202180046093.X, dated Oct. 24, 2025.

Office Action issued in related U.S. Appl. No. 18/003,782, filed Oct. 23, 2025.

Office Action issued in related U.S. Appl. No. 18/003,797, filed Oct. 31, 2025.

Office Action issued in related CN Application No. 202180046089.3, Action dated Sep. 19, 2025.

Office Action issued in related CN Application No. 202180046124.1, dated Sep. 29, 2025.

Office Action issued in related JP Application No. 2022-533809, dated Sep. 16, 2025.

Decision on Rejection issued in Chinese Patent Application No. 202180046124.1, dated Jan. 15, 2026.

Office Action issued in Japanese Patent Application No. 2022-533809, dated Mar. 3, 2026.

Office Action issued in related U.S. Appl. No. 18/003,785, dated Dec. 31, 2025.

Office Action issued in related U.S. Appl. No. 18/003,793, dated Mar. 25, 2026.

Office Action issued in related U.S. Appl. No. 18/003,771, dated Mar. 13, 2026.

Office Action issued in Chinese Patent Application No. 202180046089.3, dated Mar. 25, 2026.

* cited by examiner

WATER-SOLUBLE FILM AND PACKAGE

TECHNICAL FIELD

The present invention relates to a water-soluble film suitably used for packaging various chemicals and a package using the same.

RELATED ART

Water-soluble films are used in a wide range of fields, such as packaging of various chemicals such as liquid detergents and pesticides, and seed tapes encapsulating seeds, by utilizing their excellent solubility in water.

For water-soluble films to be used for such an application, polyvinyl alcohol resins (hereinafter, may be referred to as "PVA") are mainly used. A water-soluble films in which water-solubility is enhanced by blending various additives such as a plasticizer and by using modified polyvinyl alcohol have been disclosed (see, for example, Patent Document 1).

PRIOR ART DOCUMENT

Patent Document

Patent Document 1: JP-A 2017-078166

SUMMARY OF THE INVENTION

Problem to be Solved by the Invention

When producing a water-soluble film, a film forming stock solution containing PVA and a solvent is generally poured onto a support such as a metal roll or drum, and the solvent is evaporated and removed to obtain a film. However, hydrophilic PVA generally has a higher affinity with metals than resins such as polyolefins and tends to be difficult to peel off from the support. If the peeling from the support is poor, unevenness in film thickness and unevenness in physical properties such as mechanical strength and solubility will occur.

In order to improve releasability of the water-soluble film from the support, a method of adding a surfactant to the film forming stock solution for the water-soluble film is known.

However, when adding a surfactant having a high affinity for the PVA to the film forming stock solution for the water-soluble film, a large amount of a surfactant must be added in order to obtain sufficient peelability, which is not preferable from the viewpoint of economy. In addition, when the large amount of the surfactant is added, the surfactant tends to bleed out to a surface of the water-soluble film, and the films tend to block each other. On the other hand, when adding a surfactant having a low affinity for the PVA to the film forming stock solution for the water-soluble film, the peelability of the film is improved even if the amount of the surfactant added is small, but phase separation occurs between the PVA and the surfactant in the film forming stock solution, and fine particles of the surfactant are dispersed in the film, which tends to reduce the transparency of the film. Therefore, even if the amount of the surfactant added to the film forming stock solution is reduced and the content of the surfactant in the water-soluble film is reduced, a water-soluble film having excellent releasability from a support and good transparency has been desired.

An object of the present invention is to provide a water-soluble film having good transparency and good releasability from a support with less surfactant content.

Means for Solving the Problem

Time-of-flight secondary ion mass spectrometry (hereinafter, may be referred to as "TOF-SIMS") is available as a method for analyzing components present on a surface of a film and components present inside the film in the depth direction. In the analysis method, it is possible to grasp distribution of various additive components on the film surface by specifying fragment ions derived from various additives. Also, by etching and analyzing the film surface, it is possible to grasp the distribution of the various additive components in the film depth direction.

For example, if analysis is focused on signals of fragment ions derived from the surfactant contained in the film, a segregation state of the surfactant on the surface of the film, that is, the segregation state on the surface of the film and the surface obtained by etching in the depth direction of the film, can be estimated by comparing the signal intensities.

The inventors of the present invention have made intensive studies based on the knowledge obtained from the detailed analysis of the segregation state of surfactants in various water-soluble films by TOF-SIMS. As a result, the inventors have found that the above object is achieved by a water-soluble film in which the segregation state of the surfactant on the film surface satisfies a specific relationship, and based on this knowledge, the inventors have further studied and completed the present invention.

That is, the present invention relates to:

[1] A water-soluble film containing a polyvinyl alcohol resin and surfactant, wherein a content of the surfactant is 0.005 to 1 parts by mass with respect to 100 parts by mass of the polyvinyl alcohol resin, and a ratio $S(0)/S(32)$ of an abundance amount $S(0)$ of the surfactant on at least one surface of the water-soluble film to an abundance amount $S(32)$ of the surfactant on a cross-section surface at a depth of 32 nm from the at least one surface of the water-soluble film, measured by a count number of fragment ions derived from the surfactant detected by time-of-flight secondary ion mass spectrometry on the at least one surface of the water-soluble film, is in the range of 100 to 500.

Further, the present invention relates to:

[2] The water-soluble film in the above-mentioned item [1], wherein the surfactant is a nitrogen-containing surfactant;

[3] The water-soluble film in the above-mentioned item [2], wherein the nitrogen-containing surfactant contains at least one selected from the group consisting of an alkylamine-based surfactant, an alkylamide-based surfactant and an alkylalkanolamide-based surfactant;

[4] The water-soluble film in the above-mentioned item [3], wherein the alkylamine-based surfactant is a polyoxyethylene alkylamine-based surfactant, and the alkylamide-based surfactant is a higher fatty acid diethanolamide-based surfactant;

[5] The water-soluble film in any one of the above-mentioned items [1] to [4] containing a filler; and

[6] The water-soluble film in the above-mentioned item [5], wherein the filler is inorganic particles.

Furthermore, the present invention relates to:

[7] A package in which the water-soluble film described in any one of the above mentioned items [1] to [6] stores a chemical;

[8] The package in the above-mentioned item [7], wherein the chemical is a pesticide, a detergent or a disinfectant; and

[9] The package in the above-mentioned item [7] or [8], wherein the chemical is in a liquid form.

Effects of the Invention

According to the present invention, it is possible to provide a water-soluble film having good transparency and good releasability from a support with less surfactant content.

Mode for Carrying Out the Invention

The present invention is specifically described below.

A water-soluble film of the present invention contains PVA and a surfactant. In addition, the water-soluble film may contain other resins and components than the PVA, for example, additives such as plasticizers.

<Surfactant>

In the present invention, the water-soluble film contains a surfactant in order to obtain good releasability from a support.

A content of the surfactant in the water-soluble film has to be 0.005 to 1 parts by weight with respect to 100 parts by weight of the PVA. If the content of the surfactant is less than 0.005 parts by mass, in producing the water-soluble film, the peelability of the water-soluble film from the support becomes poor, or problems such as blocking between the water-soluble films tend to occur. From this point of view, the content of the surfactant in the water-soluble film is preferably 0.01 parts by mass or more, more preferably 0.02 parts by mass or more, and even more preferably 0.05 parts by mass or more. On the other hand, when the content of the surfactant exceeds 1 parts by mass, bleeding out of the surfactant to the surface of the water-soluble film and deterioration of transparency of the water-soluble film due to aggregation of the surfactant are likely to occur. From this point of view, the content of the surfactant in the water-soluble film is preferably 0.8 parts by mass or less, more preferably 0.6 parts by mass or less, even more preferably 0.4 parts by mass or less, and particularly preferably 0.3 parts by mass or less.

Here, the content of the surfactant in the water-soluble film is a ratio of the mass of the surfactant to the mass of the PVA contained in the entire water-soluble film. Surfactants are generally non-volatile, and the content of the surfactant in the water-soluble film substantially corresponds to the mass of the surfactant relative to the mass of the PVA in a film forming stock solution for the water-soluble film. If the surfactant is volatile, the content of the surfactant in the water-soluble film can be measured by a method of quantifying surfactant concentration in a solvent obtained by dissolving the water-soluble film in a good solvent for the PVA such as hexafluoroisopropanol, adding a poor solvent for the PVA such as methanol to reprecipitate and removing the PVA by liquid chromatography analysis or the like.

The type of the surfactant is not particularly limited, and for example, anionic surfactants, nonionic surfactants, or the like can be used, but it is preferable that the surfactant has moderate affinity with the PVA contained in the water-soluble film. If the affinity with the PVA is too high, the surfactant tends to be uniformly dispersed in the PVA, resulting in an insufficient amount of the surfactant present on the surface of the water-soluble film, so that the releasability of the water-soluble film from the support may become poor.

On the other hand, if the affinity with the PVA is too low, in the film forming stock solution for the water-soluble film or in a process of drying and solidifying the film forming stock solution on the support, the surfactant and the PVA phase-separate to form droplets, so that it tends to cause deterioration of the transparency of the film and roughening of the surface of the film.

As a surfactant having a moderate affinity for the PVA, a nitrogen-containing surfactant is preferable, and examples of the nitrogen-containing surfactant include alkylamine-based surfactants, alkylamide-based surfactants, and alkyl-alkanolamide-based surfactants. Therefore, the water-soluble film of the present invention preferably contains at least one surfactant selected from the group consisting of alkylamine-based surfactants, alkylamide-based surfactants, and alkylalkanolamide-based surfactants.

Examples of alkylamine-based surfactants include higher fatty acid amine salts such as oleylamine acetate, and polyoxyalkylenealkylamine-based surfactants such as polyoxyethylene laurylamine.

Examples of alkylamide-based surfactants include polyoxyalkylenealkylamide-based surfactants such as polyoxyethylene laurylamide.

Examples of alkylalkanolamide-based surfactants include higher fatty acid alkanolamide-based surfactants such as lauric acid alkanolamide.

Among these, from the viewpoint that it is easy to obtain the water-soluble film with excellent peelability from the support under a wider range of production conditions, the polyoxyethylene alkylamine-based surfactant or the higher fatty acid alkanolamide-based surfactant is more preferred, and the polyoxyethylene alkylamine-based surfactant is even more preferred.

These surfactants may be used singly or in combination of two or more.

<TOF-SIMS Measurement>

In the present invention, a ratio of an abundance amount $S(0)$ of the surfactant on at least one surface of the water-soluble film to an abundance amount $S(32)$ of the surfactant on a cross-section surface at a depth of 32 nm from the at least one surface of the water-soluble film, measured by a count number of fragment ions derived from the surfactant in the water-soluble film detected by TOF-SIMS on the at least one surface of the water-soluble film, is in the range of 100 to 500. In this regard, the ratio of the abundance amount $S(0)$ on the surface and the abundance amount $S(32)$ on the cross-section surface at a depth of 32 nm from the surface of the water-soluble film is a value obtained by dividing the $S(0)$ by the $S(32)$ (hereinafter, may be referred to as "$S(0)/S(32)$").

The $S(0)$ is an amount of the surfactant present on the at least one surface as measured by the count number of the detected fragment ions derived from the surfactant when analyzing the at least one surface of the water-soluble film by TOF-SIMS. On the other hand, the $S(32)$ is an amount of the surfactant present on the cross-section surface at the depth of 32 nm from the at least one surface (the same surface as the surface on which the $S(0)$ is measured) of the water-soluble film as measured by the count number of the detected fragment ions derived from the surfactant when a surface (hereinafter, may be referred to as "etched surface") of the water-soluble film exposed by etching at the depth of 32 nm from the surface is analyzed by TOF-SIMS after etching 32 nm in the depth direction from the surface (the same surface as the surface on which the S(0) is measured) of the water-soluble film. The fact that the S(0)/S(32) is 100 or more means that the abundance amount of the surfactant on the surface of the water-soluble film is 100 times or more the abundance amount of the surfactant on the cross-section surface at the depth of 32 nm from the surface of the water-soluble film.

When the S(0)/S(32) is small, it means that the segregation of the surfactant on the surface of the water-soluble film is insufficient, and this tends to cause deterioration in the releasability of the water-soluble film from the support or deterioration in the transparency of the water-soluble film. The S(0)/S(32) is preferably 150 or more, more preferably 200 or more, and even more preferably 250 or more.

On the other hand, when the S(0)/S(32) is large, it means that the segregation of the surfactant on the surface of the water-soluble film is large, and the surface of the water-soluble film is sticky and tends to cause blocking between the films and deterioration of transportability. The S(0)/S(32) is preferably 450 or less, more preferably 400 or less, even more preferably 350 or less.

The count number of the S(0) and the S(32) is not particularly limited as long as it can be distinguished from other fragment ions, but it is preferably 50 or more, more preferably 100 or more, and even more preferably 1000 or more so as to make influence of noise or the like negligible.

As described above, the water-soluble film of the present invention can ensure good releasability from the support by reducing the amount of surfactant added and allowing the surfactant to segregate on the surface of the film. In addition, it is possible to avoid decrease in transparency of the film which occurs when the surfactant is added excessively.

A method for controlling S(0)/S(32) within the above range includes a method of selecting film-forming conditions for the water-soluble film, such as conditions for preparing the film forming stock solution, extrusion conditions, drying conditions and the like, which will be described later, in addition to selecting the type and the content of the surfactant that has an appropriate affinity for the PVA. By combining these methods, the water-soluble film of the present invention can be obtained.

A specific implementation method of TOF-SIMS measurement will be described below.

<Sample Adjustment>

The water-soluble film was cut into a size of 5 mm×5 mm, and set on a measurement pedestal via a conductive double-sided tape. In the measurement, the surface of the film not etched and the etched surface at a depth of 32 nm from the surface of the film obtained by etching the surface of the film were measured, and TOF-SIMS measurement was performed under the following <TOF-SIMS measurement conditions>. In this regard, a position at a depth of 32 nm from the surface of the film was defined as the 200th analysis position when etching was performed under the following <Etching treatment conditions>.

<TOF-SIMS Measurement Conditions>
  Measuring device: TOF-SIMS 5 (manufactured by ION-TOF)
  Analysis software: Surface Lab 6 (manufactured by ION-TOF)
  Primary ion source: $Bi_3^{++}$
  Measurement current: 0.2 pA at 25 keV (10 kHz)
  Measurement range: 200 μm×200 μm
  Number of measurement pixels: 128 Pix×128 Pix
  Charge neutralization conditions: neutralization electron gun not used Measurement of the count number: the number of fragments captured by the detector (detector intensity)

<Etching Treatment Conditions>
  Etching mode: GCIB
  Etching source: Ar cluster
  Raster size: 500 μm x 500 μm
  Current: 0.26 nA A cycle was repeated in which TOF-SIMS measurement was performed once after a total of 0.16 nm was etched in the depth direction from the surface of the water-soluble film by etching three times under the above <etching treatment conditions>. Therefore, a depth of 0.16 nm is etched for each TOF-SIMS measurement, and the value at the depth of 32 nm from the surface of the water-soluble film is the analysis result of the 200th point (Etching rate: 0.16 nm/1 scan). Note that this etching rate (0.16 nm/1 scan) is a value obtained assuming that it is the same as the etching rate (0.16 nm/1 scan) when etching a sample of a water-soluble film with a known film thickness measured with an ellipsometer or the like under the same conditions, separately.

<Method for Selecting Fragment Ions Derived from Surfactant>

A wide variety of fragment ions are counted when the water-soluble film is measured by TOF-SIMS. Among them, the fragment ions characteristic of the surfactant contained in the water-soluble film are selected and counted. The fragment ions that are characteristic of surfactants include, for example, fragment ions that are strong in intensity and are not considered to be generated from other components in the water-soluble film. As a specific selection method, the water-soluble film containing no surfactant is measured by TOF-SIMS under the same conditions as above, and fragment ions with strong intensity or fragment ions independent of other fragment ions are selected from among the fragment ions that hardly appear in the water-soluble film containing no surfactant but appear in the water-soluble film containing the surfactant. For the selected fragment ions, the counts on the surface of the water-soluble film and the etched surface at the depth of 32 nm from the surface of the water-soluble film were measured and designated as S(0) and S(32), respectively.

<Polyvinyl Alcohol Resin>

The water-soluble film of the present invention contains PVA. As the PVA, a polymer produced by saponifying a vinyl ester based polymer obtained by polymerizing a vinyl ester based monomer can be used. Examples of vinyl ester based monomers include vinyl formate, vinyl acetate, vinyl propionate, vinyl valerate, vinyl laurate, vinyl stearate, vinyl benzoate, vinyl pivalate, and vinyl versatate, and the like. Among them, vinyl acetate is preferable as the vinyl ester monomer.

The vinyl ester based polymer is preferably obtained using only one or two or more kinds of vinyl ester monomer as a monomer and more preferably obtained using only one kind of vinyl ester monomer as the monomer, and may be a copolymer of one or two or more kinds of vinyl ester monomer and other monomer copolymerizable therewith.

Examples of such other monomer copolymerizable with the vinyl ester monomer include, for example, ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like. The vinyl ester based polymer may have a structural unit derived from one or two or more kinds of the other monomer above.

From the viewpoint of the water solubility and mechanical strength of the water-soluble film, the ratio of structural units derived from the other monomer in the vinyl ester based polymer is preferably 15 mol % or less, more preferably 5 mol % or less, based on the number of moles of all structural units constituting the vinyl ester based polymer.

A degree of polymerization of the PVA is not particularly limited, but the lower limit of the degree of polymerization is preferably 200 or more, more preferably 300 or more, and even more preferably 500 or more from the viewpoint of the film strength. On the other hand, the upper limit of the degree of polymerization is preferably 8,000 or less, more preferably 5,000 or less, and even more preferably 3,000 or less from the viewpoint of PVA productivity, productivity of the water-soluble film, and the like. Here, the degree of polymerization means the average degree of polymerization $(P_o)$ measured in accordance with the description of JIS K 6726-1994, and the degree of polymerization is determined by the following formula from the intrinsic viscosity $[\eta]$ (unit: deciliter/g) measured in water at 30° C. after resaponifying and purifying of the PVA.

$$Degree\ of\ polymerization\ P_o=([\eta]\times10^4/8.29)^{(1/0.62)}$$

In the present invention, the degree of saponification of the PVA is preferably 64 to 99.9 mol %. By adjusting the degree of saponification of the PVA in this range, it is easy to achieve both water solubility and physical properties of the film. The degree of saponification is more preferably 70 mol % or more, and even more preferably 75 mol % or more. On the other hand, the degree of saponification is more preferably 99.6 mol % or less, and even more preferably 99.3 mol % or less. In this context, the degree of saponification of the PVA means a ratio (mol %) indicating the number of moles of the vinyl alcohol units based on the total number of moles of the structural units (typically, vinyl ester based monomer units) that may be converted to vinyl alcohol units by saponification and the vinyl alcohol units in the PVA. The degree of saponification of the PVA based polymer can be measured in accordance with the description of JIS K6726-1994.

The water-soluble film of the present invention may contain one type of PVA singly or may contain two or more types of PVA having different degrees of polymerization, saponification, modification, and the like.

In the present invention, the upper limit of the content of the PVA in the water-soluble film is preferably 100% by mass. On the other hand, the lower limit of the content of the PVA is preferably 50% by mass, more preferably 80% by mass, and even more preferably 85% by mass.

<Filler>

In the present invention, the water-soluble film preferably contains a filler in order to improve the releasability of the water-soluble film from the support. The average particle size of the filler is preferably 0.5 to 50 μm. If the average particle size of the filler is less than 0.5 μm, the effect of improving the releasability may not be sufficient, and if it exceeds 50 μm, the transparency of the water-soluble film may decrease. The average particle size of the filler is more preferably 1 to 30 μm, even more preferably 1.5 to 15 μm.

The material of the filler is not particularly limited, and may be an inorganic filler or an organic filler, and examples thereof include clay, talc, alumina, starch, acrylic resin fine particles, and the like. Among them, inorganic fine particles are preferable from the viewpoint of cost, handleability, and the like.

A content of the filler in the water-soluble film is preferably 15 parts by mass or less, more preferably 10 parts by mass or less with respect to 100 parts by mass of the PVA. If the content is more than 15 parts by mass, there is a risk that processability will deteriorate. On the other hand, when the content is too small, sufficient effects may not be obtained. The content of the filler is preferably 0.5 parts by mass or more, more preferably 1 part by mass or more.

<Plasticizer>

In the state of containing no plasticizer, the film containing the PVA is rigid compared with other plastic films, and mechanical properties such as impact strength and processability during secondary processing may be deteriorated. To prevent these problems, the water-soluble film of the present invention preferably contains a plasticizer. Examples of preferred plasticizers include polyhydric alcohols, and specific examples include polyhydric alcohols, such as ethylene glycol, glycerin, diglycerin, propylene glycol, diethylene glycol, triethylene glycol, tetraethylene glycol, trimethylolpropane, sorbitol, and the like. One kind of these plasticizers may be singly used or two or more kinds of them may be used together. Among these plasticizers, from the viewpoint of not readily bleeding out to the surface of the water-soluble film and the like, ethylene glycol or glycerin are preferable and glycerin is more preferable.

When the water-soluble film of the present invention contains a plasticizer, the content thereof is preferably 1 part by mass or more, more preferably 3 parts by mass or more, even more preferably 5 parts by mass or more with respect to 100 parts by mass of the PVA contained in the water-soluble film. Also, the content of the plasticizer is preferably 70 parts by mass or less, more preferably 50 parts by mass or less, and even more preferably 40 parts by mass or less. If the content of the plasticizer is less than 1 part by mass, the effect of improving mechanical properties such as impact strength of the water-soluble film may not be sufficient. On the other hand, if the above content exceeds 70 parts by mass, the water-soluble film may become too flexible, which may lead to deterioration in handleability or bleeding out to the surface of the water-soluble film.

<Water-Soluble Polymer>

For the purpose of imparting mechanical strength to the water-soluble film, maintaining the moisture resistance for handling the film, regulating the rate of flexibilization due to water absorption during the dissolution of the film, or the like, the water-soluble film of the present invention may contain a water-soluble polymer other than PVA.

Examples of the water-soluble polymers other than the PVA include dextrin, gelatin, glue, casein, shellac, gum arabic, polyacrylic acid amide, sodium polyacrylate, polyvinyl methyl ether, copolymers of methyl vinyl ether and maleic anhydride, Copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

A content of the water-soluble polymer other than the PVA in the water-soluble film is preferably 15 parts by mass or less, and more preferably 10 parts by mass or less with respect to 100 parts by mass of the PVA. When the content exceeds 15 parts by mass, the water solubility of the water-soluble film may be reduced.

<Other Components>

The water-soluble film of the present invention may contain components such as moisture, antioxidants, UV absorbers, lubricants, cross-linking agents, coloring agents, fillers, preservatives, antifungal agents, and other polymer compounds other than the surfactant, the plasticizer, and the water-soluble polymer other than the PVA, as long as they do not interfere with the effects of the present invention. A ratio of the total weight of the PVA, the surfactant, the plasticizer, and the water-soluble polymer other than PVA to the total weight of the water-soluble film of the present invention is preferably in the range of 60 to 100% by mass, more preferably in the range of 80 to 100% by mass, and even more preferably in the range of 90 to 100% by mass.

<Water-Soluble Film>

The water-soluble film of the present invention preferably has a complete dissolution time of 150 seconds or less when immersed in water at 10° C. When the complete dissolution time is 150 seconds or less, it can be suitably used as a packaging film for chemicals and the like. The complete dissolution time is more preferably 90 seconds or less, even more preferably 60 seconds or less, and particularly preferably 45 seconds or less. On the other hand, the lower limit of the complete dissolution time is not particularly limited, but the water-soluble film with a too short complete dissolution time tends to cause blocking between the films due to absorption of moisture in the atmosphere and a decrease in film strength. Therefore, the lower limit of the complete dissolution time is preferably 5 seconds or more, more preferably 10 seconds or more, even more preferably 15 seconds or more, and particularly preferably 20 seconds or more.

A thickness of the water-soluble film of the present invention is not particularly limited, but if the thickness is too thick, the secondary processability of the water-soluble film tends to deteriorate. Therefore, the thickness of the water-soluble film is preferably 200 μm or less, more preferably 150 μm or less, even more preferably 100 μm or less, and particularly preferably 50 μm or less. Further, if the thickness is too thin, the mechanical strength of the water-soluble film may decrease. Therefore, the thickness of the water-soluble film is preferably 5 μm or more, more preferably 10 μm or more, even more preferably 15 μm or more, and particularly preferably 20 μm or more. The thickness of the water-soluble film can be obtained by measuring the thickness at 10 arbitrary points (for example, 10 arbitrary points on a straight line drawn in the length direction of the water-soluble film) and calculating the average value of the measured thicknesses.

<Method for Producing Water-Soluble Film>

The method for producing the water-soluble film of the present invention may be an arbitrary method, such as a film formation method where a solvent, a surfactant, and the like are added to the PVA and homogenized to obtain a film forming stock solution to be used in (i) casting film-forming method, (ii) wet film-forming method discharging the film forming stock solution into a poor solvent, (iii) dry/wet film-forming method, (iv) gel film-forming method by extracting and removing the solvent after once cooling and gelling the film forming stock solution to obtain the PVA film, (v) method of forming the film by combining these method, (vi) melt extrusion film-forming method where the above film forming stock solution thus obtained is extruded from a T die or the like using an extruder or the like, (vii) inflation molding method, and the like. Among the methods described above, (i) casting film-forming method and (vi) melt extrusion film-forming method are preferable because the homogeneous water-soluble film can be obtained with high productivity. (i) casting film-forming method or (vi) melt extrusion film-forming method for the water-soluble film will be described below.

In a case of forming the water-soluble film by (i) casting film-formation method or (vi) melt extrusion film-formation method, the above film forming stock solution is casted in the form of film on a support, such as a metal roll and a metal belt and heated to remove the solvent and thus solidified to be formed into a film. The solidified film is released from the support, dried as needed by a drying roll, a drying furnace, and the like, and further heat treated as needed to be wound and thus allowed to be produced into a long water-soluble film in a roll.

Surfactants in the film forming stock solution are considered to gradually phase-separate in the film forming stock solution to form fine droplets, except for surfactants that have a very high affinity for the PVA. When such a film forming stock solution is made to flow in a pipe, the surfactant tends to gradually move to the vicinity of a pipe wall due to a shear rate distribution from a pipe center to the pipe wall. The concentration of the surfactant in the vicinity of a wall surface of the pipe tends to increase, and as a result, the concentration of the surfactant on the film surface of the film forming stock solution cast on the support increases and the abundance amounts S(0) and S(32) of the surfactant on the surface portion of the resulting water-soluble film tend to increase. Therefore, by adjusting a speed of movement of the surfactant in the pipe, it is possible to adjust the abundance amounts S(0) and S(32) of the surfactant on the surface of the resulting water-soluble film. Here, the speed of movement of the surfactant is affected by film-forming conditions such as the state of dispersion of the surfactant immediately after preparation of the film forming stock solution, the temperature (viscosity) of the film forming stock solution, the shear rate in the flow path piping, the presence or absence of a kneading device such as a static mixer, the drying speed of the cast film forming stock solution, or the like, in addition to the surfactant's affinity for the PVA. Therefore, by adjusting these factors, the abundance amounts S(0) and S(32) of the surfactant on the surface portion of the water-soluble film of the present invention can be adjusted.

A method of preparing the film forming stock solution includes, for example, a method of dissolving the PVA, the surfactant, and, if necessary, an additive such as the plasticizer in a dissolution tank or the like, a method of melt-kneading the PVA in a water-containing state using a single-screw or a twin-screw extruder together with the surfactant and, if necessary, the plasticizer, and the like.

If a shear rate in preparing the film forming stock solution is too low, the surfactant may be poorly dispersed and the transparency of the water-soluble film may be reduced. On the other hand, if the shear rate is too high, the surfactant may be dispersed too much, resulting in insufficient segregation of the surfactant on the surface of the water-soluble film. The shear rate when preparing the film forming stock solution is preferably from 10 to 300 s$^{-1}$, more preferably from 20 to 250 s$^{-1}$, even more preferably from 30 to 200 s$^{-1}$. In addition, the above shear rate refers to the highest shear rate in an adjusting device for the film forming stock solution, and for example, when adjusting while stirring with a stirring blade in a tank, the above shear rate is a value obtained by dividing the speed of the tip of the stirring blade by the distance between the tip of the stirring blade and the wall surface of the tank. Further, In the case of the single-screw extruder, the shear rate is a value obtained by dividing the linear velocity at the bottom of the groove in the metering portion of the screw (usually the tip of the screw) by the depth of the groove.

A volatile content concentration of the film forming stock solution is preferably in the range of 50 to 90% by mass and more preferably in the range of 55 to 80% by mass. The volatile content concentration is a concentration of volatile components such as solvents that are removed by volatilization or evaporation during film formation or the like. The volatile content concentration of less than 50% by mass causes an increase in the viscosity of the film forming stock solution and sometimes causes difficulty in film formation. Meanwhile, the volatile content concentration of more than 90% by mass causes a decrease in the viscosity and is likely to impair uniformity in the thickness of the film to be obtained. As used herein, the term "volatile content ratio of the film forming stock solution" refers to a value obtained by the following formula.

$$\text{Volatile content (\% by mass) of film forming stock solution} = \{(Wa-Wb)/Wa\} \times 100$$

In the formula, Wa represents the mass (g) of the film forming stock solution, and Wb represents the mass (g) after drying the film forming stock solution of Wa (g) in an electric heat dryer at 105° C. for 16 hours.

The prepared film forming stock solution is sent to a T-die or the like through a pipe or the like and discharged in the form of a film. The dispersed state of the surfactant droplets can be changed by installing a filter in the pipe or the like to remove the surfactant droplets, or by installing a static mixer or the like. However, if the dispersed state of the surfactant droplets becomes excessively uniform as described above, the degree of segregation of the surfactant on the surface of the water-soluble film may decrease.

If the temperature of the film forming stock solution in the pipe, the T-die or the like is too high, the surfactant may excessively segregate on the surface of the water-soluble film, which may reduce the transparency of the water-soluble film, and if the temperature of the film forming stock solution in the pipe, T-die or the like is too low, the segregation of the surfactant on the surface of the water-soluble film may not be sufficient. The temperature of the film forming stock solution in the pipe, the T-die or the like is preferably 70 to 130° C., more preferably 80 to 120° C., and even more preferably 85 to 110° C.

The shear rate in the T-die or the like has a great effect on the segregation state of the surfactant on the surface of the water-soluble film. If the shear rate is too high, the surfactant may excessively segregate on the surface of the water-soluble film, which may reduce the transparency of the water-soluble film, and if the shear rate is too low, the segregation of the surfactant on the surface of the water-soluble film may be insufficient and the releasability of the water-soluble film from the support may be insufficient. The shear rate in the T-die is preferably 100 to 1000 s$^{-1}$, more preferably 150 to 850 s$^{-1}$, even more preferably 200 to 700 s$^{-1}$.

The film forming stock solution that has been poured onto the support in the form of a film from the T-die or the like is dried and solidified on the support and in the subsequent drying step. During this time, the segregation of the surfactant on the surface of the water-soluble film progresses, albeit gradually.

A surface temperature of a first drying roll or first drying belt (hereinafter, may be referred to as "first drying roll, etc."), which is the first support on which the film forming stock solution is poured, is preferably 50 to 110° C. When the surface temperature is less than 50° C., slow drying may cause excessive segregation of the surfactant on the surface of the water-soluble film, and insufficient drying may result in poor peelability of the water-soluble film. On the other hand, when the surface temperature exceeds 110° C., there is a possibility that the film surface of the water-soluble film is likely to become abnormal due to foaming or the like, and there is a possibility that the segregation of the surfactant on the surface of the water-soluble film may not be sufficient due to rapid drying. The surface temperature of the first drying roll is preferably 60 to 100° C., more preferably 65 to 95° C.

At the same time as heating the PVA film of the film forming stock solution on the first drying roll or the like, a drying rate may be adjusted by uniformly blowing hot air at a wind speed of 1 to 10 m/sec to the entire area of a non-contact surface side of the film PVA of the film forming stock solution with the first drying roll or the like. From the viewpoint of drying efficiency and uniformity of drying, the temperature of the hot air blown to the non-contact surface side is preferably 50 to 150° C., more preferably 70 to 120° C.

The water-soluble film peeled off from the first drying roll or the like continues to be used as a subsequent support (hereinafter, may be referred to as "drying roll or the like", and when there are two or more, "second drying roll", "third drying roll", or "second drying belt", "third drying belt") is preferably dried to the volatile content of 5 to 50% by mass. After drying to the preferred range of the volatile content, it is peeled off and further dried if necessary. A drying method is not particularly limited, and a method using a drying oven can be used in addition to the method of contacting with the drying roll or the like. When the film is dried with a plurality of drying rolls or the like, it is preferable to alternately bring one surface and the other surface of the film into contact with the second drying roll and thereafter, in order to make both surfaces uniform. For example, the number after the second drying roll is preferably 3 or more, more preferably 4 or more, and even more preferably 5 to 30 including the second drying roll. The temperature after the drying oven, the second drying roll, or the second drying belt is preferably 40° C. or more and 110° C. or less. The upper limit of the temperature after the drying oven, the second drying roll, or the second drying belt is more preferably 100° C. or less, more preferably 90° C. or less, and even more preferably 85° C. or less.

The water-soluble film can be further heat-treated as necessary. By performing heat treatment, it is possible to adjust the strength, the water solubility and a birefringence index of the film. The heat treatment temperature is preferably 60° C. or more and 135° C. or less. The upper limit of the heat treatment temperature is more preferably 130° C. or less. If the heat treatment temperature is too high, there is a risk that the water solubility of the water-soluble film will decrease.

The water-soluble film thus produced is subjected to further humidity control, cutting of both ends (edges) of the film, and the like as needed, and wound in a roll on a cylindrical core and moisture-proof packaged to form a product.

The volatile content of the PVA film finally obtained by a series of treatments is not particularly limited, but is preferably 1 to 5% by mass, more preferably 2 to 4% by mass.

<Application>

The water-soluble film of the present invention can be suitably used for various water-soluble film applications. Examples of the above-mentioned film applications include chemical packaging films, liquid pressure transfer base films, embroidery base films, release films for forming artificial marble, seed packaging films, waste storage bag films, and the like. Among these, the water-soluble film of the present invention is preferably used as the chemical packaging film because the effects of the present invention are exhibited more remarkably, and in particular, it is preferably used as an oxidizable chemical packaging film.

When the water-soluble film of the present invention is used as the chemical packaging film, the types of chemicals include, for example, pesticides, detergents (including bleaching agents), disinfectants, and the like. The physical properties of the chemical are not particularly limited, and may be acidic, neutral, or alkaline. In addition, the chemical may contain a boron-containing compound. The chemical may be in the form of powder, mass, gel or liquid. The form of packaging is also not particularly limited, and the form of unit packaging (preferably sealed packaging) in which the chemical is packaged by unit amount is preferred. The package of the present invention is obtained by applying the water-soluble film of the present invention to the chemical packaging film to package the chemical.

EXAMPLES

Hereinafter, the present invention will be specifically described below with reference to examples and the like, but the present invention is not limited by the following examples. Evaluation items and evaluation methods adopted in the following examples and comparative examples are as follows.

[TOF-SIMS Measurement]

The S(0) and the S(32) of the films obtained in the following examples or comparative examples were measured using the apparatus and the conditions described above to obtain S(0)/S(32).

[Peelability of Water-Soluble Film]

The peelability of the film from the support when forming the water-soluble film in Examples and Comparative Examples was evaluated according to the following criteria. A first drying roll was used as the support for peelability evaluation.

A: In the position in the circumferential direction of the support, the position where the film separates from the film-forming support is at approximately the same position in the width direction, and the peeling position is almost on a straight line when viewed in the width direction, and the film can be stably formed.

B: The position where the film separates from the support slightly fluctuates in the width direction, and the peeling position is uneven when viewed in the width direction, but stable film formation is possible.

C: The position where the film separates from the support fluctuates greatly in the width direction, and the film shows clear thickness unevenness, but continuous film formation is possible.

D: It is difficult to stably peel the film from the support, and the film cannot be continuously formed.

[Haze Value of Water-Soluble Film]

A straight line was drawn on the water-soluble film obtained in the following examples or comparative examples in the width direction (TD) of the film perpendicular to the film edge. 5 cm from both ends of the straight line of the film was removed, and the remaining portion was divided into 20 equal sections. Using the central portion of each of the 20 equally divided sections as the measurement point, a haze value at that measurement point was measured using a haze meter "HZ-1" manufactured by Suga Test Instruments Co., Ltd. according to ASTM D1003-61. In the following examples and comparative examples, the films with a width of 170 cm were formed, and the center portion of each section having a width of 8 cm obtained by dividing 160 cm into 20 equal sections with 5 cm removed from both ends was measured. The haze value of the water-soluble film was obtained by averaging the haze values obtained at 20 locations.

Example 1

100 parts by mass of methyl maleate (MA)-modified PVA obtained by saponifying polyvinyl acetate (degree of saponification 99 mol %, degree of polymerization 1700, degree of MA modification 5 mol %), 10 parts by mass of glycerin as a plasticizer, 0.2 parts by mass of polyoxyethylene laurylamine as a surfactant and water were added to a dissolution tank and mixed at a maximum shear rate of 150 s$^{-1}$ using a paddle-type stirring blade to prepare a film forming stock solution with a volatile content of 60% by mass. The resulting film forming stock solution was filtered, adjusted to a temperature of 95° C., discharged from a T-die at a maximum shear rate of 360 s$^{-1}$ to a first drying roll having a surface temperature of 85° C., dried by blowing hot air of 85° C. at a speed of 5 m/second over the entire non-contact surface of a film to be formed with the first drying roll to obtain the film, and then peeled off the film from the first drying roll. The peelability of the film was A.

Drying the film was performed so that one surface and the other surface of the film peeled from the first drying roll are alternately in contact with the subsequent drying rolls, and the film was wound to obtain a water-soluble film (thickness 35 μm, width 170 cm).

When TOF-SIMS measurement of the obtained water-soluble film was performed, $C_3H_7N_2O^+$ ions were characteristically detected in comparison with a water-soluble film obtained in the same manner as described above without the addition of a surfactant (hereinafter, may be referred to as "control film"), and S(0) was 1980000 and S(32) was 6390 based on the ion count number. Therefore, S(0)/S(32) was 310. The haze of this water-soluble film was 0.6%.

Comparative Example 1

A water-soluble film was obtained in the same manner as in Example 1, except that the shape of the paddle-type stirring blade when preparing the film forming stock solution was changed to adjust the maximum shear rate to 350 $s^{-1}$, the temperature of the film forming stock solution in the T die was changed to 85° C., and the lip opening of the T die was changed to adjust the maximum shear rate in the T die to 80 $s^{-1}$. Table 1 shows the TOF-SIMS measurement results, the peelability and the haze of the water-soluble film. In the TOF-SIMS measurement, $C_3H_7N_2O^+$ ions were characteristically detected as compared with the control film.

Comparative Example 2

An attempt was made to prepare a film forming stock solution and form a film in the same manner as in Example 1, except that the amount of surfactant was changed to 0.001 parts by mass, but the peelability of the water-soluble film from the first drying roll was D, and the water-soluble film could not be stably obtained. Therefore, TOF-SIMS measurement and the haze measurement could not be performed.

Comparative Example 3

A water-soluble film was obtained in the same manner as in Example 1, except that the amount of surfactant was changed to 3 parts by mass. Table 1 shows the TOF-SIMS measurement results, the peelability and the haze of the water-soluble film. In the TOF-SIMS measurement, $C_3H_7N_2O^+$ ions were characteristically detected as compared with the control film.

Example 2

A water-soluble film was obtained in the same manner as in Example 1, except that the surfactant was changed to lauric acid diethanolamide. When the TOF-SIMS measurement of the obtained water-soluble film was performed, $C_4H_{10}NO_2^+$ ions were characteristically detected compared with the control film, and S(0)/S(32) was 440 from the count number of these ions. Table 1 shows the peelability and the haze of the water-soluble film.

Example 3

A water-soluble film was obtained in the same manner as in Example 1, except that the PVA was changed to unmodified PVA obtained by saponifying polyvinyl acetate (degree of saponification: 88 mol %, degree of polymerization: 1700). Table 1 shows the TOF-SIMS measurement results, the peelability and the haze of the water-soluble film. In the TOF-SIMS measurement, $C_3H_7N_2O^+$ ions were characteristically detected as compared with the control film.

Example 4

A water-soluble film was obtained in the same manner as in Example 2, except that the amount of surfactant was changed to 0.08 parts by mass. Table 1 shows the TOF-SIMS measurement results, the peelability and the haze of the water-soluble film. In the TOF-SIMS measurement, $C_4H_{10}NO_2^+$ ions were characteristically detected as compared with the control film.

Example 5

A water-soluble film was obtained in the same manner as in Example 4, except that 3 parts by mass of talc having an average particle size of 3 μm was added as a filler to the film forming stock solution. Table 1 shows the TOF-SIMS measurement results, the peelability and the haze of the water-soluble film. In the TOF-SIMS measurement, $C_4H_{10}NO_2^+$ ions were characteristically detected as compared with the control film.

Comparative Example 4

A water-soluble film was obtained in the same manner as in Example 2, except that the amount of the surfactant was changed to 0.8 parts by mass, the shape of the paddle-type stirring blade when preparing the film forming stock solution was changed to adjust the maximum shear rate to 75 $s^{-1}$, and the lip opening of the T die was changed to adjust the shear rate in the T die to 1030 $s^{-1}$. Table 1 shows the TOF-SIMS measurement results, the peelability and the haze of the water-soluble film. In the TOF-SIMS measurement, $C_4H_{10}NO_2^+$ ions were characteristically detected as compared with the control film.

TABLE 1

| | Composition of film | | | | | | | Preparation of film forming stock solution | T die | | | | |
| | PVA | | | | | | | | | Temperature | | | | |
| | Modification | | | | | | | | | | | | | |
| | Degree of saponification (mol %) | Type | Degree of modification (mol %) | Surfactant | | Filler | | forming stock solution | of film forming stock solution (° C.) | Maximum shear | TOF-SIMS | Evaluation | |
| | | | | Type | Content (part by mass) | Type | Content (part by mass) | Maximum shear rate ($s^{-1}$) | | rate ($s^{-1}$) | S (0)/ S (32) | Peelability | Haze (%) |
|---|---|---|---|---|---|---|---|---|---|---|---|---|---|
| Example 1 | 99 | MA | 5 | *1 | 0.2 | — | — | 150 | 95 | 360 | 310 | A | 0.6 |
| Example 2 | 99 | MA | 5 | *2 | 0.2 | — | — | 150 | 95 | 360 | 440 | A | 1.3 |
| Example 3 | 88 | — | — | *1 | 0.2 | — | — | 150 | 95 | 360 | 280 | A | 0.5 |
| Example 4 | 99 | MA | 5 | *2 | 0.08 | — | — | 150 | 95 | 360 | 330 | B | 0.7 |
| Example 5 | 99 | MA | 5 | *2 | 0.08 | Talc | 3 | 150 | 95 | 360 | 380 | A | 1.2 |
| Comparative Example 1 | 99 | MA | 5 | *1 | 0.2 | — | — | 350 | 85 | 80 | 84 | C | 0.9 |

TABLE 1-continued

| | Composition of film | | | | | | | Preparation | | | | | | |
| | PVA | | | | | | | of film | T die | | | | | |
| | | Modification | | | | | | forming | Temperature | | | | | |
| | Degree of | | Degree of | Surfactant | | Filler | | stock | of film | Maximum | TOF- | | | |
| | saponifi- | | modifi- | | Content | | Content | solution | forming | shear | SIMS | Evaluation | | |
| | cation (mol %) | Type | cation (mol %) | Type | (part by mass) | Type | (part by mass) | Maximum shear rate (s$^{-1}$) | stock solution (° C.) | rate (s$^{-1}$) | S (0)/ S (32) | Peel- ability | Haze (%) |
| Comparative Example 2 | 99 | MA | 5 | *1 | 0.001 | — | — | 150 | 95 | 360 | — | D | — |
| Comparative Example 3 | 99 | MA | 5 | *1 | 3 | — | — | 150 | 95 | 360 | 280 | A | 2.8 |
| Comparative Example 4 | 99 | MA | 5 | *2 | 0.8 | — | — | 75 | 95 | 1030 | 570 | A | 2.9 |

Surfactant
*1: Polyoxyethylene laurylamine
*2: Lauric acid diethanolamide

As shown in Table 1, the water-soluble film of the present invention has good peelability even with a relatively low surfactant content and has good transparency due to its low haze. The resulting water-soluble film can be suitably used for various water-soluble film applications. In particular, the water-soluble film of the present invention is suitable as a chemical packaging film, and suitable as a package for packaging pesticides, detergents (including bleach), disinfectants, and the like.

What is claimed is:

1. A water-soluble film containing a polyvinyl alcohol resin and surfactant, wherein a content of the surfactant is 0.005 to 1 parts by mass with respect to 100 parts by mass of the polyvinyl alcohol resin, and a ratio S(0)/S(32) of an abundance amount S(0) of the surfactant on at least one surface of the water-soluble film to an abundance amount S(32) of the surfactant on a cross-section surface at a depth of 32 nm from the at least one surface of the water-soluble film, measured by a count number of fragment ions derived from the surfactant detected by time-of-flight secondary ion mass spectrometry on the at least one surface of the water-soluble film, is in the range of 100 to 500.

2. The water-soluble film as claimed in claim 1, wherein the surfactant is a nitrogen-containing surfactant.

3. The water-soluble film as claimed in claim 2, wherein the nitrogen-containing surfactant contains at least one selected from the group consisting of an alkylamine-based surfactant, an alkylamide-based surfactant and an alkylalkanolamide-based surfactant.

4. The water-soluble film as claimed in claim 3, wherein the alkylamine-based surfactant is a polyoxyethylene alkylamine-based surfactant, and the alkylamide-based surfactant is a higher fatty acid diethanolamide-based surfactant.

5. The water-soluble film as claimed in claim 1 containing a filler.

6. The water-soluble film as claimed in claim 5, wherein the filler is inorganic particles.

7. A package in which the water-soluble film as claimed in claim 1 stores a chemical.

8. The package as claimed in claim 7, wherein the chemical is a pesticide, a detergent or a disinfectant.

9. The package as claimed in claim 7, wherein the chemical is in a liquid form.

10. The water-soluble film as claimed in claim 1, wherein the polyvinyl alcohol resin excludes a copolymer of vinyl ester-based monomer and an allyl compound.

11. The water-soluble film as claimed in claim 1, wherein the polyvinyl alcohol resin comprises a methyl maleate (MA)-modified polyvinyl alcohol resin.

12. The water-soluble film as claimed in claim 1, wherein the water-soluble film excludes starch.

13. The water-soluble film as claimed in claim 5, wherein the filler is selected from the group consisting of clay, talc, alumina, and acrylic resin fine particles.

14. The water-soluble film as claimed in claim 1, wherein the surfactant comprises polyoxyethylene laurylamine.

15. The water-soluble film as claimed in claim 1, wherein the surfactant comprises lauric acid diethanolamide.

* * * * *